Sept. 6, 1955  F. WINKELSTRÄTER  2,716,836
APPARATUS FOR DISTRIBUTING INSECTICIDES
Filed Aug. 19, 1950
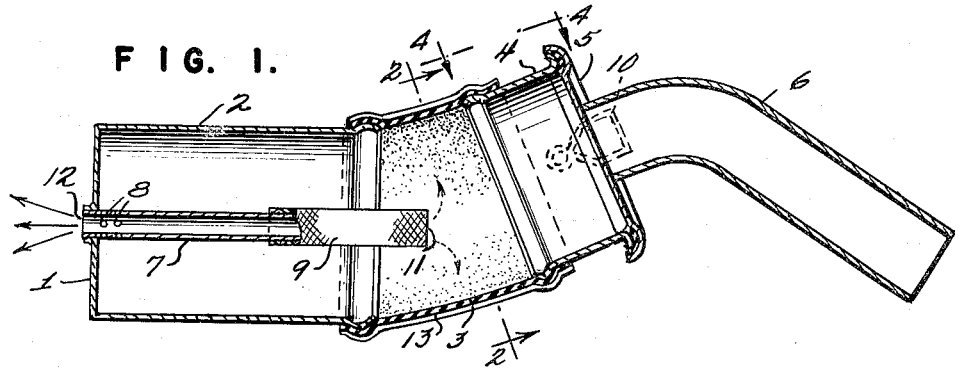
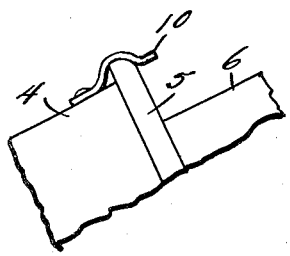
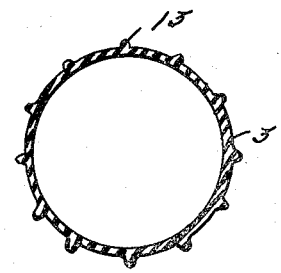
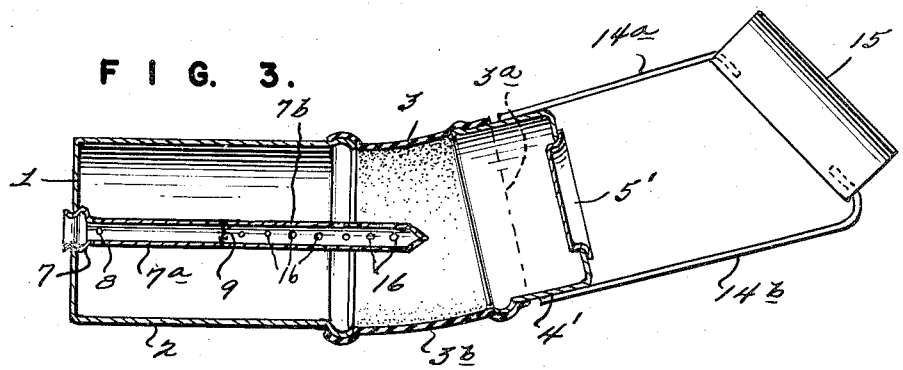
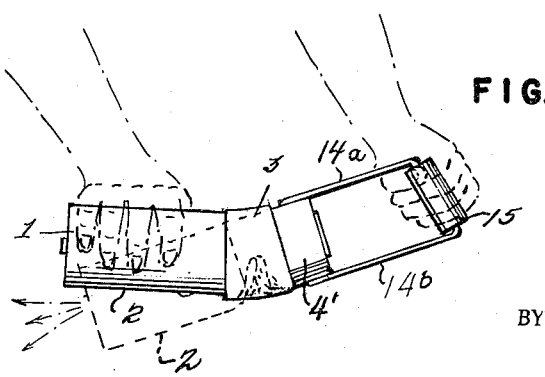
INVENTOR
FRITZ WINKELSTRÄTER
BY *Bley and Chromy*
his ATTORNEYS

United States Patent Office 2,716,836
Patented Sept. 6, 1955

2,716,836

APPARATUS FOR DISTRIBUTING INSECTICIDES

Fritz Winkelsträter, Wuppertal-Wichlinghausen, Germany, assignor to M. A. Bitzer, Elizabethton, Tenn.

Application August 19, 1950, Serial No. 180,468

1 Claim. (Cl. 43—146)

The present invention relates to a portable device for the application of pulverulent insecticides to plants. This device comprises two rigid cylindrical parts connected with each other by means of a flexible rubber sleeve. These two cylindrical parts and the rubber sleeve serve as a container for the pulverulent material and the upper one of the two cylindrical parts is provided with a detachable cover and a handle, while the bottom of the other cylindrical part is provided with a small pipe extending into the device. The portion of this pipe near the mid portion of the device is provided with a filter through which air is sucked into the apparatus and the portion of this pipe near the said bottom is provided with a number of perforations or apertures through which the pulverulent material is blown out of the device.

The flexible rubber sleeve is self-sustaining and is strong enough to endure the swinging movement that the lower one of the two parts is required to perform when the apparatus is in operation. For this purpose the rubber sleeve may be provided with stiffening or reinforcing ribs which, being similar to the construction of bellows, may either extend in longitudinal or transverse direction.

When the device is in operation, air is alternately expelled from and sucked into the interior of the apparatus during the swinging movement of the lower part of the device or when the lower one of the aforesaid cylindrical parts is flexed with respect to the upper part. When the air enters the apparatus the pulverulent material is whirled up and when the swinging movement is continued the whirled-up material is blown out of the apparatus in a finely divided state onto the plants to be treated.

The rubber sleeve should preferably be formed so that the ends thereof are not parallel but are disposed at an acute angle to each other so that the sleeve is shorter along one side than along the other side. The cylindrical parts are preferably made of metal, and for securing the rubber sleeve to the cylindrical parts the ends of the rubber sleeve may merely be slipped onto them or fastened to the cylindrical parts in any other suitable way.

The handle of the apparatus may be fastened to the detachable cover so that it extends from the cover in ascending direction. For detachably securing the cover and appertaining handle to the upper one of the cylindrical parts the latter may be equipped with snap fastening means of any suitable type.

Instead of fastening the handle to the detachable cover it is also possible to secure it to the upper one of the cylindrical parts by a pair of supporting arms fastened to the sides thereof. In the latter case the supporting arms should be of unequal length and so arranged that the longer one of the supporting arms and the longer side of the flexible rubber sleeve are both positioned on the same side of the device, with the result that the handle is angularly inclined with respect to the upper part of the device, and that the handle is disposed at an acute angle to the center line of the lower one of the cylindrical parts. This form of construction is particularly suited for cases in which a comparatively large area has to be dusted. The advantage of such an inclined handle in either cited instance permits ease of operation and use of the apparatus, since the lower cylindrical part can be readily swung or oscillated.

As has already been said, the rubber sleeve is shorter at one side than at the other side. With this sleeve construction the connection between the two cylindrical parts permits flexing of the device when one hand of the operator is holding the apparatus at the handle, while the other hand is operating the lower one of the cylindrical parts and performing the flexing pumping movements. In this way it is possible to apply the dusting material to smallest areas, such as insect nests and the like, in the most effective way, which is not possible with dusting devices of the reciprocating kind.

It may further be mentioned that, in order to insure the perfect operation of the device, only so much of the pulverulent material should be put into the apparatus that the lower one of the cylindrical parts is filled up with it to preferably not more than a quarter of its entire height.

The invention will be best understood from a consideration of the following detailed description, taken in connection with the accompanying drawings, forming a part of this specification, with the understanding however, that the invention is not confined to any strict conformity with the showing of the drawings, but may be changed or modified, so long as such changes or modifications mark no material departure from the salient features of the invention as expressed in the appended claim.

In the drawings in which like and corresponding parts are referred to by the same reference numerals in all of the several figures:

Figure 1 is a longitudinal sectional view of the apparatus with a portion of the filtering tube in elevation;

Figure 2 is a cross-section of the rubber sleeve on line 2—2 of Figure 1;

Figure 3 is a longitudinal sectional view of a modified form of construction with parts in elevation;

Figure 4 is a detail view on line 4—4 of Fig. 1 showing one of the snap fasteners for holding the cover of the device shown in Figure 1; and Figure 5 is a view showing how the device is flexed through the flexible sleeve thereof by the operator to apply pulverulent material to a small plant area.

Referring now to the drawings in detail, the reference numeral 1 denotes the bottom of the cylindrical container 2. Slipped onto the upper end of the container 2 is a rubber sleeve 3, which is formed so that its ends are not parallel but are askew to each other or are disposed in planes having an acute angle therebetween. The upper end portion of the sleeve 3 is pushed onto the lower end of the cylindrical member 4, the upper end of which is closed by the detachable cover 5 that is provided with the handle 6 having a hand-grip portion.

Arranged in the container 2 is the small pipe 7 having its lower open end fastened in a central opening of the bottom 1 of the container 2. The upper end of the pipe 7 is provided with a cylindrical filtering tube 9. Distributed around the circumference of the pipe 7, near the lower open end thereof, are two rows of perforations 8. When the device is bowed or flexed by means of the flexible sleeve 3 with the short side thereof acting as a hinge member and the long side folding as a bellows, pulverulent material is expelled from the device through the holes 8. Air is sucked into the device when the device is unbowed as shown in Fig. 1, and this unbowing may be accomplished by the sleeve 3 assuming its normal shape by its own self-sustaining character.

The rubber sleeve 3 is provided on its outside with a plurality of stiffening ribs 13 for reinforcing purposes. This sleeve is of such strength that it is able to retain its form and shape and it is therefore self sustaining. The handle 6 is rigidly connected to the cover 5 which is secured to the cylindrical member 4 by a plurality of snap fastener means 10. The cover may be lifted off of the container by means of the handle 6 when the fasteners 10 are released and additional dusting material may be put into the apparatus as needed. A packing ring of rubber or the like is interposed between the cover 5 and the cylindrical member 4 to insure a tight closure therebetween.

The dotted line arrows 11 indicate the direction in which the current of air sucked into the apparatus by the swinging movement of the container 2 flows into the device when the flexible rubber sleeve provided between the container 2 and the cylindrical member 4 assumes its normal unfolded shape, and the full line arrows 12 indicate the direction in which the pulverulent material is blown out of the device when the device is flexed or bowed as illustrated in Fig. 5.

In the modification illustrated in Fig. 3 the cylindrical container 2 is also connected by the intermediary of a rubber sleeve 3 to a cylindrical member 4'. Secured to the cylindrical member 4' by means of supporting arms 14a and 14b is the handle 15. The lower ends of the arms 14a and 14b are fixed snugly against the entire length of the upper end of the cylindrical member 4'. It will be noticed that the arms 14a and 14b are of unequal length. The device is provided with the detachable clamping cover 5' for covering the mouth of the cylindrical member 4' through which pulverulent material is placed into the device.

The upper edge 3a of the rubber sleeve 3 is disposed at an acute angle with respect to the lower edge so that the longer side 3b of the sleeve is positioned on the same side as the longer supporting arm 14b with the result that the longitudinal axis of upper part 4' of the device is inclined toward the handle 15. The handle is also disposed at an acute angle to the longitudinal axis of the cylindrical container 2. The ribs 13, shown in Figs. 1 and 2, have been omitted from the sleeve 3 in Figs. 3 and 5.

The pipe 7 fastened in the bottom 1 of the container 2 is provided near its open lower end with a circular row of perforations 8 distributed over the circumference thereof. There are no perforations in the portion 7a of the pipe, while there are a large number of perforations 16 in the portion 7b of the latter right up to the upper closed end of the pipe. Between the two portions 7a and 7b the pipe 7 is provided with a filtering screen 9.

What I claim as new and desire to secure by Letters Patent of the United States is:

In a portable device for applying pulverulent insecticides to plants, a first hollow tubular member of rigid material open at one end and closed at the other end, a second hollow tubular member of rigid material open at one end and having a bottom at the other end, a cylindrical sleeve of flexible elastic material attached at one end to the open end of the said first mentioned hollow tubular member, said sleeve being attached at its other end to the open end of said second hollow tubular member, said sleeve being of such strength that it is self-sustaining and normally supports said members in spaced relation, said second member being adapted to serve as a container for the pulverulent material, an upwardly inclined handle rigidly secured to said first hollow tubular member, the ends of said sleeve being askew to each other so that said sleeve holds said first member and said second member in spaced relation with the axes thereof out of alignment, a small pipe having a diameter that is small compared to the diameter of said second tubular member, means for fastening one open end of said pipe in an aperture formed in the bottom of said second member so that said pipe is in communication with the outside atmosphere, one of the sides of said sleeve being substantially shorter than the opposite side, said handle being attached to said first hollow member with the longitudinal axis of the handgrip portion of said handle tilted with respect to the longitudinal axis of said first hollow member and extending upwardly toward the longer side of said sleeve, the axis of said handle lying in a plane that passes through both the short side and the long side of said sleeve so that said short side of said sleeve acts as a hinge between said first and said second members while the long side folds upon itself when said second member is flexed with respect to said first member, said pipe having small apertures therethrough near the bottom of said second member through which the pulverulent material is forced out of the device when said first and second members are flexed with respect to each other, said pipe extending upwardly through the pulverulent material in said second member and into said sleeve so that air is drawn into the device through said pipe when the device is unflexed and said self sustaining sleeve assumes its normal self sustained configuration.

References Cited in the file of this patent

UNITED STATES PATENTS

| | | |
|---|---|---|
| 192,975 | Canedy et al. | July 10, 1877 |
| 1,854,458 | De Quincy et al. | Apr. 19, 1932 |
| 1,905,650 | Raley | Apr. 25, 1933 |
| 1,960,308 | Grashow | May 29, 1934 |
| 2,491,118 | Lee | Dec. 13, 1949 |
| 2,551,676 | Hoffman | May 8, 1951 |

FOREIGN PATENTS

| | | |
|---|---|---|
| 35,194 | France | June 25, 1929 |
| | (1st addition to 580,311) | |
| 413,766 | France | June 3, 1910 |
| 447,423 | France | Oct. 28, 1912 |
| 623,758 | France | Mar. 22, 1927 |